United States Patent Office 3,495,904
Patented Feb. 17, 1970

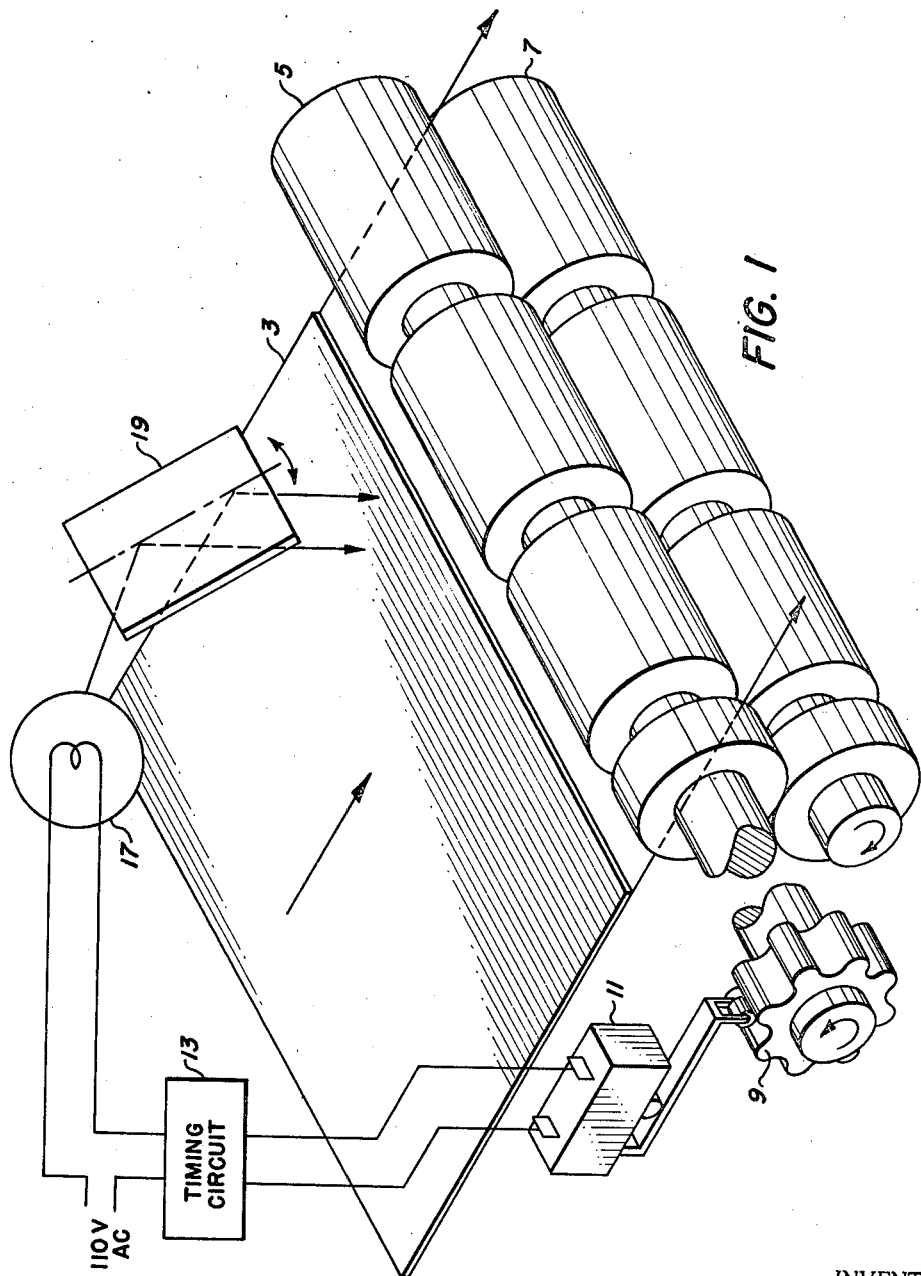
INVENTOR.
ROBERT J. KELSCH
PAUL F. SCHMITT
ATTORNEY

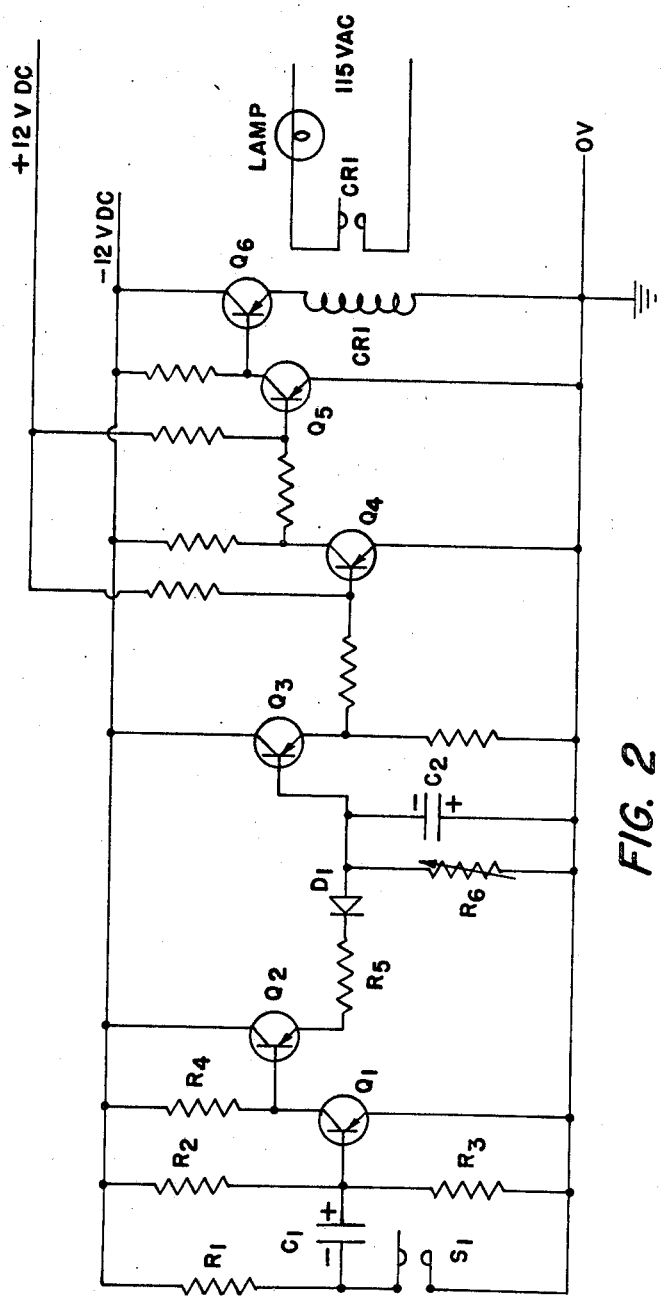

3,495,904
RADIANT ENERGY PROTECTIVE APPARATUS
Robert J. Kelsch, Penfield, and Paul F. Schmitt, Walworth, N.Y., assignors to Xerox Corporation, Rochester, N.Y., a corporation of New York
Filed Nov. 22, 1966, Ser. No. 596,281
Int. Cl. G03b *27/10*
U.S. Cl. 355—84                                   7 Claims

ABSTRACT OF THE DISCLOSURE

In graphic information scanning and transporting systems a document motion detection device acts to protect the original documents from burning or tearing. As a document is moving through said scanning and transport system, a multi-noded cam on the end of a follower roll opens and closes in rapid succession a microswitch electrically connected to the input of a timing circuit. Upon a paper jam the follower roll would discontinue rotation, thereby interrupting the operation of the cam and microswitch. A finite time later, the timing circuit will disconnect the power source from the illumination lamp or the transport system thereby protecting the document from scorching or burning and tearing or ripping of the original document.

BACKGROUND

In facsimile systems or in office copy machines, it is conventional to have relative motion between an original document and a source of scanning rays. The scanning rays are scanned in some predetermined fashion across the document for subsequent utilization thereof, i.e., transmisison or recreation of the original document. The brighter the image scanning rays become the more responsive and selective mya be the detection system. With a low powered source of image scanning rays, the detection system must of necessity be more sensitive, which inherently adds noise or other undesirable effects to the output signal therefrom.

It is desirable, therefore, to use as high an energy exposure lamp as is possible without causing damage to the original document. Such a high powered source of rays is desirable in that information detection becomes less complex with the additional advantage of higher resolution and information density. If, however, a paper jam occurs in the machine, whether a facsimile scanning device or office copying machine, the danger arises of the effect of the extreme heat radiated by the high energy exposure lamp. As an original document may be difficult to replace, it is highly desirable to de-energize the exposure lamp and/or the transport system as quickly as the jam is detected so as to prevent scorching, burning or tearing of the original document. One prior art solution is to continually monitor by mechanical means the movement of the document through the mechanical transport. Such a system is undesirable, however, as different size paper or torn or mutilated sheets may be used which render the mechanical detection device inoperative. If such a jam would occur with an unreliable jam detector, the possibility arises of the original document being destroyed due to the heat energy radiated by the high energy exposure lamp or tearing by continual movement of the transport system.

OBJECTS

It is, accordingly, an object of the present invention to protect an original document from burning, scorching and tearing in a graphic scanning system.

It is another object of the present invention to de-energize the high energy exposure lamp when a paper jam occurs in an information scanning system.

It is another object of the present invention to detect paper jams in information scanning systems regardless of the size and condition of the document.

It is another object of the present invention to detect the motion of any flat, or relatively flat material through a transport system.

BRIEF SUMMARY OF THE INVENTION

In accomplishing the above and other desired aspects, applicants have invented novel apparatus for de-energizing a high energy exposure lamp in a graphic information scanning system upon detection of a paper jam therein. As a document is moving through the document transport system, a multi-noded cam on the end of a paper follower roll opens and closes in rapid succession a microswitch electrically connected to the input of a timing circuit. As the follower cam shaft rotates, the circuit continually allows the line power to energize the high energy illumination source. Upon a paper jam, however, the follower roll will discontinue revolving, thus interrupting the operation of the cam and microswitch operation. A finite time after this discontinuance of operation, the timing circuit will disconnect the power source, thus de-energizing the illumination lamp. In this manner, the document is safe from burning or scorching until the paper jam in the machine can be corrected.

BRIEF DESCRIPTION OF THE DRAWINGS

For a more complete understanding of the invention, as well as other objects and further features thereof, reference may be had to the following detailed description in conjunction with the drawings wherein:

FIGURE 1 is an isometric diagram of the radiant energy protection device in accordance wtih the principles of the present invention; and FIGURE 2 is a schematic diagram of the timing circuit as shown and described in conjunction with FIGURE 1.

DETAILED DESCRIPTION

Referring now to FIGURE 1, there is shown part of a paper feed mechanism for use in apparatus such as a facsimile scanning system or an office copier machine. The lower roll 7 rotates in a clockwise direction as shown by the arrow, by a motor, not shown, and in turn revolves the upper or follower roller 5, which is in intimate contact with the lower roll 7. When a document 3 is fed through the rollers, the document itself provides the friction between the lower roll 7 and the upper or follower roll 5 to allow the top roller to turn.

At one end of the upper or follower roll 5 is a cam 9 with a predetermined number of cam nodes. In conjunction with the cam nodes is a microswitch 11 such that the switch is energized every time a node comes in contact with the armature of the switch 11. The continuous switching of the switch 11 energizes the timing circuit 13 which allows the 110 volt A.C. or other power supply to energize the high energy exposure lamp 17. The rays from the lamp 17 impinge upon reciprocating or stationary mirror 19 or directly to scan document 3 by any of the known techniques.

There is a time delay of predetermined amount in timing circuit 13. Thus, if the paper document is moving through the system in a normal manner the lower roll 7 via the document 3 turns the upper roll 5 and thus cam 9. In this manner the microswitch 11 is continually opened and closed thereby energizing timing circuit 13 which allows the lamp 17 to continuously illuminate the document. If, however, the paper jams in any manner, the follower roll 5 will stop rotating because the paper itself is not moving through the rollers. In this situation cam 9 no longer operates the microswitch 11 and after the predetermined time delay the timing circuit 13 will de-energize the lamp 17, thus preventing any scorching or burning of the document. If the jam clears itself and the document starts to move again through the system, the cam 9 once again activates microswitch 11 and timing circuit 13 allows lamp 17 to be illuminated again.

If it is desired, the timing circuit could also be used to de-energize the transporting system in addition to the illumination lamp. In this instance, the document would be protected not only from burning or scorching but also from tearing or ripping by the moving roller 7.

It is to be noted that the configuration of FIGURE 1 is drawn to a scanning system in a facsimile or office copier machine. The invention has further utilization in a system wherein roll heaters are used in a fusing application to fix xerographic images. The invention would operate in a similar manner in that if the document with the electrostatic image in the form of toner particles passes through a roll heater device, the paper protective device will protect a paper jam and disconnect the electric current through the heaters, saving the document from scorching or burning. Further, in FIGURE 1 it is to be understood that the upper roll 5 would be allowed limited travel in a vertical direction to compensate for the thickness of the document paper. The distance that the upper roll 5 moves would not affect the operation of the switch because of the configuration of the cam and the small distance the roll might move in response to different paper thicknesses.

In FIGURE 2 is shown the timing circuit 13 used for detecting a paper jam and for de-energizing the lamp 17. With $S_1$ designating the microswitch of FIGURE 1, it can be seen that when $S_1$ opens, $C_1$ charges through $R_1$ toward −12 volts, for example, with the polarity as shown in FIGURE 2. When $S_1$ closes, the charge on the side of the capacitor $C_1$ designated with a minus sign is forced to zero volts potential due to the connection from ground to that side of the capacitor. The positive potential side of $C_1$ is raised to a positive voltage equal to the potential that $C_1$ had been charged prior to operation of the microswitch. This positive voltage applied to the base of transistor $Q_1$ inhibits its conduction and therefore the collector of $Q_1$ would be at −12 volts DC due to such non-conduction. Transistor $Q_2$ wired as an emitter-follower, will then charge capacitor $C_2$ toward −12 volts through resistor $R_5$ and diode $D_1$. $C_1$ is charging toward a voltage determined by resistor $R_2$ and $R_3$. This voltage allows transistor $Q_1$ to conduct and now its collector would approach 0 volts. Transistor $Q_2$ as the emitter-follower, would not transfer such voltage to capacitor $C_2$ as diode $D_1$ is now reversed biased. Capacitor $C_2$ thus stores the voltage previously impressed upon it for the length of time determined by the R-C time constant of $C_2$ and $R_6$.

The voltage on $C_2$ is transferred by transistor $Q_3$, also wired as an emitter-follower, to bias transistor $Q_4$ into conduction. The output of $Q_4$ is inverted by transistor $Q_5$ to enable transistor $Q_6$ to conduct and energize relay $CR_1$. The contacts of the relay $CR_1$ supply the power to the lamp 17 as long as the relay coil $CR_1$ is energized. $C_2$, however, must be re-charged before discharging to a level which results in the de-energizing of relay $CR_1$. Capacitor $C_2$ is re-charged by coupling a voltage transient through capacitor $C_1$ which would now be energized again by the next cam lobe, which indicates that document motion still exists. If switch $S_1$ remains either opened or closed for a length of time longer than the time determined by $C_2$ and $R_6$, relay $CR_1$ would be de-energized. The time constant may be adjusted by varying $R_6$ and/or $C_2$.

In the foregoing, there has been disclosed apparatus for disabling a high energy exposure lamp upon detection of a paper jam in an optical scanning system. The invention has been described in conjunction with the detection and protection of a document in a graphic information system but it is apparent that the invention could be utilized to detect and protect the movement of any flat material through a transport system. While the present invention, as to its objects and advantages, as described herein, has been set forth in specific embodiments thereof, they are to be understood as illustrative only and not limiting.

What is claimed is:

1. In a graphic scanning system wherein a document is transported past an exposure lamp, a radiant energy protective transport system comprising:
   driving means for transporting the document past said exposure lamp,
   driven means in conjunction with said driving means for frictionally driving said document through said transport system,
   cam means coupled to said driven means for rotation therewith,
   switch means operatively placed in conjunction with said cam means for actuation by said cam means as it revolves, and
   timing means coupled to said switch means for deenergizing said exposure lamp after a predetermined time when said cam means ceases to revolve and to actuate said switch means due to an interruption of movement of said document through said transport system.

2. A system as defined in claim 1 wherein said timing circuit means comprises:
   means for storing a predetermined voltage upon repeated actuation of said switch means,
   means coupled to said storing means for discharging said voltage at a predetermined rate upon cessation of the actuation of said switch means, and
   means coupled to said discharging means for extinguishing said exposure lamp when said voltage falls below a predetermined level.

3. A system as defined in claim 2 wherein:
   said storing means is a capacitor,
   said discharging means is a resistor connected in parallel with said capacitor, and
   said extinguishing means is a relay,
   said relay including normally open contact points in series with said exposure lamp, whereby said relay contact points interrupt the exposure lamp circuit when said voltage falls below the operating potential of said relay.

4. In a graphic scanning and transport system wherein a document or the like is transported past an exposure lamp, apparatus for protecting said document comprising:
   driving means for transporting the document past said exposure lamp,
   driven means in conjunction with said driving means for frictionally driving said document through said transport system,
   cam means coupled to said driven means for rotation therewith,
   switch means operatively placed in conjunction with said cam means for actuation by said cam means as it revolves, and
   timing means coupled to said switch means for deenergizing said graphic scanning and transport system after a predetermined time when said cam means ceases to revolve and actuate said switch means due to an interruption of movement of said document through said transport system.

5. The apparatus as set forth in claim 4 wherein said timing means includes means for deenergizing said exposure lamp after said predetermined time, thereby protecting said document from scorching and burning from said exposure lamp.

6. The apparatus as set forth in claim 4 wherein said timing means includes means for deenergizing said transport system after said predetermined time, thereby protecting said document from tearing or ripping due to a paper jam in said transport system.

7. The apparatus as set forth in claim 4 wherein said timing means includes means for deenergizing said exposure lamp and said transport system after said predetermined time, thereby protecting said document from scorching and burning, and ripping and tearing, respectively, of said document.

References Cited

UNITED STATES PATENTS

| | | | |
|---|---|---|---|
| 3,174,419 | 3/1965 | Sable | 95—75 |
| 3,253,530 | 5/1966 | Sable | 95—75 |

NORTON ANSHER, Primary Examiner

R. L. MOSES, Assistant Examiner

U.S. Cl. X.R.

271—57